United States Patent [19]

Pizzorno

[11] 4,174,940
[45] Nov. 20, 1979

[54] APPARATUS FOR AUTOMATICALLY HANDLING A MOLD FOR TIRES WITH A RIGID SEGMENTED CORE

[75] Inventor: Augusto Pizzorno, Milan, Italy

[73] Assignee: Industrie Pirelli S.p.A., Milan, Italy

[21] Appl. No.: 947,714

[22] Filed: Oct. 2, 1978

Related U.S. Application Data

[62] Division of Ser. No. 830,870, Sep. 6, 1977.

[30] Foreign Application Priority Data

Sep. 13, 1976 [IT] Italy .............................. 27139 A/76

[51] Int. Cl.² .......................... B29H 5/02; B29F 1/00
[52] U.S. Cl. .................................. 425/577; 425/36; 425/56; 425/542

[58] Field of Search ................... 425/36, 56, 577, 589

[56] References Cited

U.S. PATENT DOCUMENTS

| | | | |
|---|---|---|---|
| 3,994,650 | 11/1976 | Nishimura et al. | 425/577 |
| 4,059,375 | 11/1977 | Koch et al. | 425/589 |
| 4,106,888 | 8/1978 | Calori | 425/577 |

Primary Examiner—J. Howard Flint, Jr.
Attorney, Agent, or Firm—Stevens, Davis, Miller & Mosher

[57] ABSTRACT

A method is disclosed for automatically disassembling and reassembling a mold for making a tire. Apparatus for automatically performing the entire tire-manufacturing operation is also disclosed.

24 Claims, 22 Drawing Figures

APPARATUS FOR AUTOMATICALLY HANDLING A MOLD FOR TIRES WITH A RIGID SEGMENTED CORE

This is a division of application Ser. No. 830,870 filed Sept. 6, 1977.

The present invention relates to an an improved apparatus for automatically handling a mold for tires with a rigid segmented core. In particular, the invention relates to the related apparatus for handling injection molds for tires provided with beads made of plastomeric or elastomeric material and an inner shape showing relevant undercuts, for instance with the sidewalls greatly concave, or convex towards the inside as described in the Italian Pat. No. 928,502, corresponding to U.S. Pat. No. 3,805,868 to Tangorra.

Generally, the molds suitable for producing tires by injection comprise an outer envelope and an inner body with a rigid core formed by a plurality of radially decomposable or collapsible sectors, at least one of which, called the "key" sector, must be displaced first to allow the removal of the other sectors between the beads of the already-formed tire.

In these molds, the outer envelope and the inner body an associated together so as to create a free space into which the plastomeric or elastomeric material is injected to originate the desired shape of the tire.

Unfortunately, in the aforesaid molds it has been ascertained that it is impossible to remove the inner sectors of the already molded tire by automatic and easy methods, and this because of the great resistance opposed by the tire sidewalls, in particular when the bead shape is similar to that described in the aforesaid Italian Pat. No. 928,502.

In order to overcome the cited drawback, it has been proposed to use appropriate forces for the removal of the sectors, but in such cases inadmissible deformations in the tire have been encountered.

Therefore, the aim of the present invention is that of providing a mold for automatically handling a mold with a rigid segmented core used for a tire obtained by injection without the aforesaid drawbacks.

Accordingly, the principal object of the present invention is an apparatus to carry out a method for disassembling and reassembling a mold for making a tire, said mold consisting of an outer envelope and an inner body consisting of a core with sectors, which can be radiall taken to pieces, with radial extensions towards the inside of the core and at least two annular elements, an upper one and a lower one, separable from each other and from the core according to the direction of the core axis, said annular element showing at least two surfaces forming axially inner surfaces of the bead of the tir to be made, said method consisting of the following phases:

(a) removing the outer envelope of the mold around the tread of the tire already molded and vulcanized as well as of thos zones of the envelope that prevent the sectors of the core from entering;

(b) supporting the sectors of the core in such a way that their center line plane is horizontal and coincides with the equatorial plane of the tire, said method being characterized by the fact that it consists of the following phases:

(c) applying forces to the lower annular element suitable for removing it from the core according to the direction of the core axis in order to spread out the sidewall of the tire below the center line plane of the core and then suitable for thrusting the sidewall overhanging said center line plane and the zone of the tread near said overhanging sidewall against the corresponding profiles of the sectors and at the same time for locking the bead below the center line plane in such a way as to keep it in contact with the surface of the lower annular element that formed the axially inner surface of said bead below;

(d) eliminating said forces applied to the lower annular element to remove it from the core during phase (c) and at the same time stopping said lower annular element by means of further forces in such a way as to continue pressing the sidewall overhanging said center line plane and the zone of the tread near said sidewall overhanging the corresponding profiles of the sectors;

(e) applying to the upper annular element the forces previously applied during phase (c) to the lower annular element with the same intensity and direction and opposite direction in such a way as to remove said upper annular element from the core in order to spread out the sidewall of the tire overhanging the center line plane in such a way as to keep it in contact with the surface of the upper annular element that formed the axially inner surface of said overhanging bead;

(f) stopping said upper annular element when it reaches a position which is symmetrical to the position reached at the end of phase (c) by the lower annular element relative to the equatorial plane of the mold;

(g) radially moving a first part of the sectors towards the axis of the core and then in the direction of the core axis in order to allow the radial contraction of the remaining sectors and to contract said remaining sectors;

(h) releasing the bead below said center line plane from the lower annular element and at the same time dragging of the whole tire by now released from the lower annular element with the upper annular element over the sectors and starting with the extraction of the tire;

(i) expanding all the sectors against an annular stiffening structure for the tire placed in such a way as to have the median line aligned with the center line plane;

(l) applying forces to the upper annular element to bring it again in contact with the sectors;

(m) eliminating said further forces which kept the lower annular element in the final position reached at the end of phase d);

(n) applying to the lower annular element the forces applied in phase (l) to the upper annular element with opposite direction in order to bring said lower annular element in contact with the sectors;

(o) rebuilding the outer envelope of the mold to mold and vulcanize a new tire; and (p) repeating the preceding phases cyclically.

The method allows one to obtain in short time an automatic and careful handling of the mold.

In fact, the spreading out of the lower sidewall first and then of the upper one of the tire avoiding any dragging thrust of the lower sidewall on the sectors in the direction of the core axis, keeps their position unchanged and not only it makes their radial disassembling possible, but also immediately after the spreading-out step and therefore permits thereafter the subsequent tire removal.

This result is very important since rapid and automatic steps of core disassembling bring about a shorter period of loss of heat of the mold and therefore requires lesser time to heat the mold again for a subsequent curing cycle of a new tire.

Accordingly, a further object of the invention is to provide an improved apparatus for handling a mold for manufacturing a tire, said mold comprising an outer envelope and an inner body associated therewith in such manner as to originate the desired shape of the tire, said inner body comprising a core formed by radially decomposable or collapsible sectors and at least two annular elements, an upper one and a lower one, separable from one another and from the core along the direction of the core axis, said elements having at least two surfaces which form axially inner surfaces of the beads of the tire to be manufactured, said apparatus comprising an upper frame, a lower frame provided with a face for the mold arranged horizontally, said frames having their central vertical axes aligned with each other to constitute the central vertical axis of the apparatus, said apparatus being characterized in that it comprises on the upper frame, respectively, a single device for the spreading out of the tire sidewalls in different phases and a single driving mechanism for the spreading out device and on the lower frame, respectively, locking means for the lower annular element in the final position corresponding to the lower spread-out sidewall, means for radial contemporaneous displacements of a first and a second part of the sectors, means for vertical displacements of said first part of the sectors already displaced radially and contemporaneously towards the center of the apparatus.

Preferably, said device, unique for the spreading out of both sidewalls, comprises a driving plate, at least two rods with teeth engaged in appropriate grooves of the lower annular element, rotating means for the rods to rotate about their own axis, said driving plate being mounted in a parallel position with respect to the face to the first ends of at least two columns which are parallel to the central axis of the apparatus and can slide in two bushings of a horizontal cross memeber arranged among the ends of two vertical uprights of the upper frame, the second ends of said columns being associated with the operating mechanism, said rods being mounted on the driving plate in a symmetrical position with respect to the central axis of the apparatus.

Preferably, said means of the apparatus suitable for contemporaneous radial displacements of the first and second part of the sectors comprise for each sector a slide sliding on a track arranged on the face, a first and a second propulsion means to displace, respectively, the first and the second part of the sectors, connection means between slider and propulsion means, said propulsion means being arranged below the face with axes parallel to the contral vertical axis of the apparatus so as to originate vertical forces transmitted through said connection means to the slides associated to the sectors.

In a preferred embodiment, said connection means comprise for each slide associated to a sector, a first and a second rack perpendicular to each other and engaging a toothed reel, the first racks being associated to the slider, the second racks being located in position by axial planes of the apparatus and the second racks relating to the slider of the first and second part of the sectors being associated respectively to the first and second propulsion means, all the reels rotating round appropriate shafts supported on a second plane of the lower frame parallel and below the face.

This preferred embodiment of the apparatus gives the advantage of easy driving of the slides and a guarantee of contemporaneous radial displacement for the sectors of the first and second part. As a matter of fact, the connections between the propulsion means and the slides, which give assurance per se since they do not greatly wear, are always able to transmit the same forces in all the directions without inertia and therefore contemporaneous displacements of the sectors.

The present invention will be still better understood by the following detailed description, made by way of non-limiting example with reference to the figures of the attached sheets of drawings in which.

In the following description the mold for making a tire is first described, and then the apparatus for drawing, for carrying, and for handling the inner body of the mold with the tire already formed and vulcanized.

Figure 1:
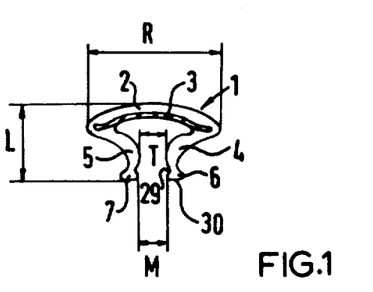
FIG. 1 represents the tire to which the invention is particularly directed.

With reference to FIG. 1, one form of a tire 1 to which the invention is particularly applicable is shown, it being understood that the invention can be applied to other specifically different tire types. Said tire comprises a tread 2, a reinforcing annular structure 3, two sidewalls 4 and 5, and two beads 6 and 7 made substantially of elastomeric material. As it is clearly visible in the figure, the tire has a tread 2 whose width is greater than that of any other part, and sidewalls with a convex shape considerably accentuated towards the inside.

The mold 8 (FIG. 2), suitable for obtaining the tire of FIG. 1, comprises an outer envelope 9 and an inner body 10 associated together in such a way as to create a hollow space, whose filling with plastomeric or elastomeric material will determine the desired shape of the tire. Said outer envelope comprises two planes namely an upper plane 11 and a lower plane 12, and several segment-shaped pieces 13. The plastomeric or elastomeric material necessary for molding the tire is injected through appropriate channels, not illustrated because they are not part of the present invention. In general, and merely by way of example, it may be noted that said channels serve to convey the molding material through openings situated adjacent the outer surface of the tread and of the beads in such a way that the molding material reaches from opposite sides the reinforcing annular structure 3, which has been previously arranged in the mold.

The inner body 10 comprises a core 14 (FIGS. 2 and 3) constituted by a first and a second part of sectors 15 and 16 and by two annular elements, an upper element 23 and a lower element 24. The first part of the sectors 15 is constituted by a group of four "key" sectors 15 alternating with another group of four sectors forming the second part 16. The so-called "key" sectors are those which, according to a per se known principle, are adapted to be radially collapsed first in order to allow the radial collapse of the remaining sectors in order to facilitate disengagement and removal of the tire from the mold.

Figure 2:
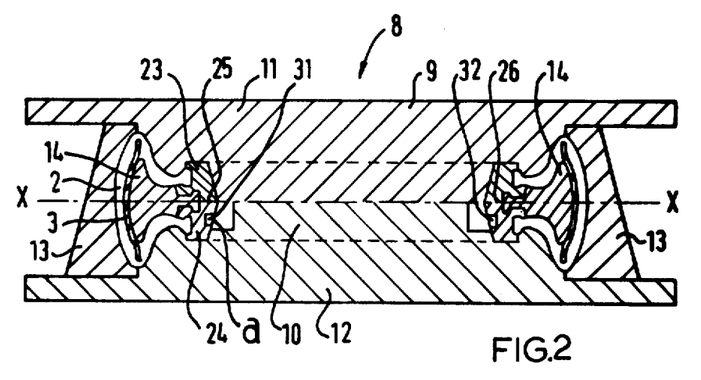
FIG. 2 represents in cross-section the mold for manufacturing the tire of FIG. 1.
Figure 3:
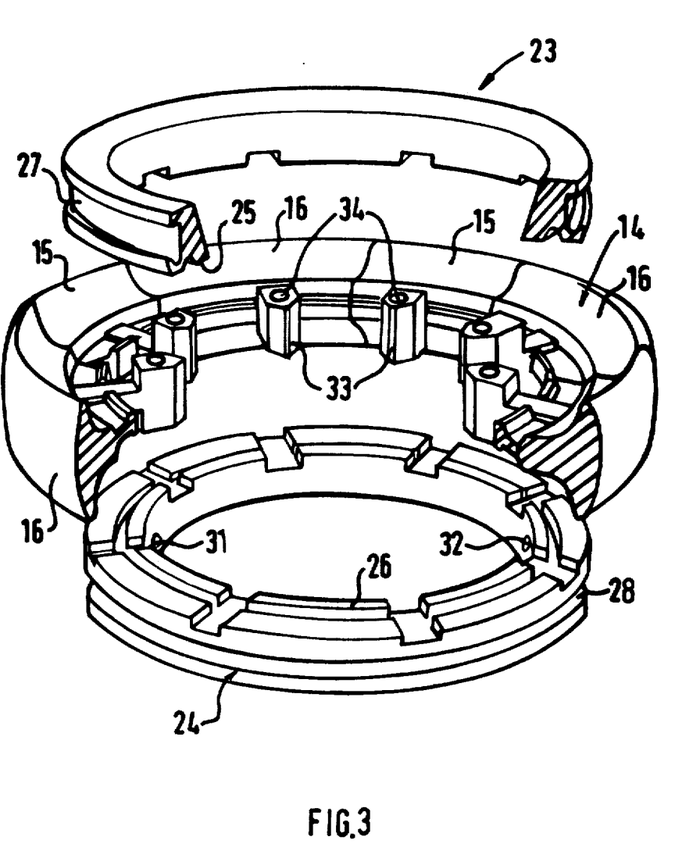
FIG. 3 represents a perspective view of the various parts of the inner body of the mold.

The annular elements 23, 24 equal and symmetrical with respect to the midplane of the mold defined by the axis x—x of FIG. 2 and coincident with the equatorial plane of the tire, are in mutual contact with each other along the base surfaces 25 and 26 (FIG. 2).

The core 14 and the annular elements 23 and 24 cooperate in determining the desired tire profile during the molding. In particular, the annular elements have circular seats 27 and 28 (FIG. 3) whose surfaces correspond to the tire surfaces comprised between the inner zone 29, connecting the sidewalls to the beads, and a part 30 of the axially outer zone of the beads (FIG. 1).

The tight union between the various parts of the mold is insured by the presence of appropriate connections which are not illustrated here for the sake of simplicity.

After having described the mold parts intended to determine the desired tire profile, a description is now given of the features which permit one to carry out the convenient disassembling of the mold during operation by means of an appropriate apparatus. These features comprise radial prolongations or lugs 33 (FIG. 3) on the sectors and at least two grooves 31 and 32 (FIGS. 2 and 3) in the lower annular element 24. These prolongations 33 are directed towards the core center and each is provided near the end with a cylindrical hole 34 whose axis is parallel to the core axis. The apparatus for disassembling the mold 8 (FIGS. 2 and 3) comprises a structure (FIGS. 4 and 5) divided into an upper frame 36 and a lower frame 37 with its axis 37' perpendicular to the horizontal face F (or any other analogous horizontal bearing surface F) on which the mold to be handled is arranged.

A single device 40 (FIG. 4) for spreading out in different phases the sidewalls of the tire to be removed from the mold and a driving mechanism 41 therefor are associated with the upper frame 36.

Associated with the lower frame (FIG. 5) are locking means 42 for the lower annular element 24 in the final position corresponding to the lower sidewall of the spread-out tire, means 43 for effecting the radial synchronous displacements of the first and of the second part of the sectors 15 and 16, and means 44 for effecting vertical displacements of the first part of the sectors.

The apparatus, besides having the function of mold handling, has the functions of drawing and carrying the inner body of th mold associated with the tire from the formation and vulcanizing zone as far as the bearing surface.

In order to allow the carrying out of the aforesaid different functions both of drawing and of carrying, the apparatus comprises an upper frame 36 displaceable with respect to the lower frame 37 and it utilizes for these functions also the spreading of device 40 (FIG. 4) for the sidewalls of the tire.

The upper frame 36 is displaceable from a first operating position A (FIG. 6), in which its axis 36' is aligned with the center of an appropriate supporting plane 45 on which the mold already removed from the formation press P, to a second operating position B in which its axis is coincident with the axis 37' of the lower frame 37.

In the preferred embodiment, the supporting plane 45 is slidable on tracks 46, 47 extending directly from the press P to the first cited operating position A.

The lower frame 37 extends on the area facing the press P and at the side of the supporting plane 45 from which it protrudes for a distance T. Therefore the overall dimensions of the whole apparatus are such that it does not require extensive space, but it takes up advantageously only the area facing the press and makes for easy access for any required maintenance work.

The apparatus comprises a horizontal cross member (or traverse) 48 (FIG. 4) which is an essential part of the upper frame and is overhangingly connected to a first vertical upright 49 extending the entire length and, by means of bearings 50, 51 (FIG. 5) inside a hollow cylindrical column 52 associated with the lower frame 37, means for rotating the first upright 49 and the cross member 48 attached thereto from the first to the second of the cited operating positions A and B, means for stopping the cross member 48 on a second vertical upright 53 (FIG. 4) in order to position it angularly with respect to the first upright 49, when the upper and lower frames have their axes 36' and 37' aligned for constituting the vertical central axis of the apparatus.

The cross member 48 (FIG. 4) supports the operating mechanism 41, and the spreading-out device 40 to which the inner body of the mold connects during the passage from the position A to the position B (FIG. 6) and in order to avoid a bending of said cross member 48 with a consequent misalignment of the spreading-out device 40 with respect to the lower frame 37, means are provided for restoring the parallelism between the cross member 48 and the bearing surface F.

In particular, the means for rotating the first upright 49 comprise on the bearing surface F, a power unit 54 (FIGS. 5, 6) with a driving belt 55 associated with a driven pulley 56 arranged around the first upright 49.

The means for restoring the parallelism between the cross member 48 and the bearing surface F (FIG. 4) comprise on the upper frame 36 at the end 57 of the cross member 48 a trolley 58 having two wheels, an upper one 59 and a lower one 60, and on the lower frame 37 a positioning or guide track 38 between and on which the two trolley wheels run. This track 38 is arranged on the second vertical upright 53 in such a position as to bring the cross member 48 again into a position of perfect parallelism with respect to the bearing surface F and consequently to allow the perpendicularity of the axis of the spreading-out device 40 with respect to the bearing surface F. The means for stopping the cross member 48 (FIG. 4) comprise a pivot or pin 62 placed between the two trolley wheels 59 and 60 and sliding with any per se known mechanism along its axis 62', a seat 63 on the second upright 53 having an inner shape exactly corresponding to the end of the pivot 62 which thus functions as a positioning detent.

When the cross member 48 is in the final position desired for the handling operations of the mold on the bearing surface F, the pivot 62 projects into the seat 63 and the two frames 36 and 37 then have their axes 36' exactly aligned in order to constitute the vertical central axis of the apparatus.

Figure 6:
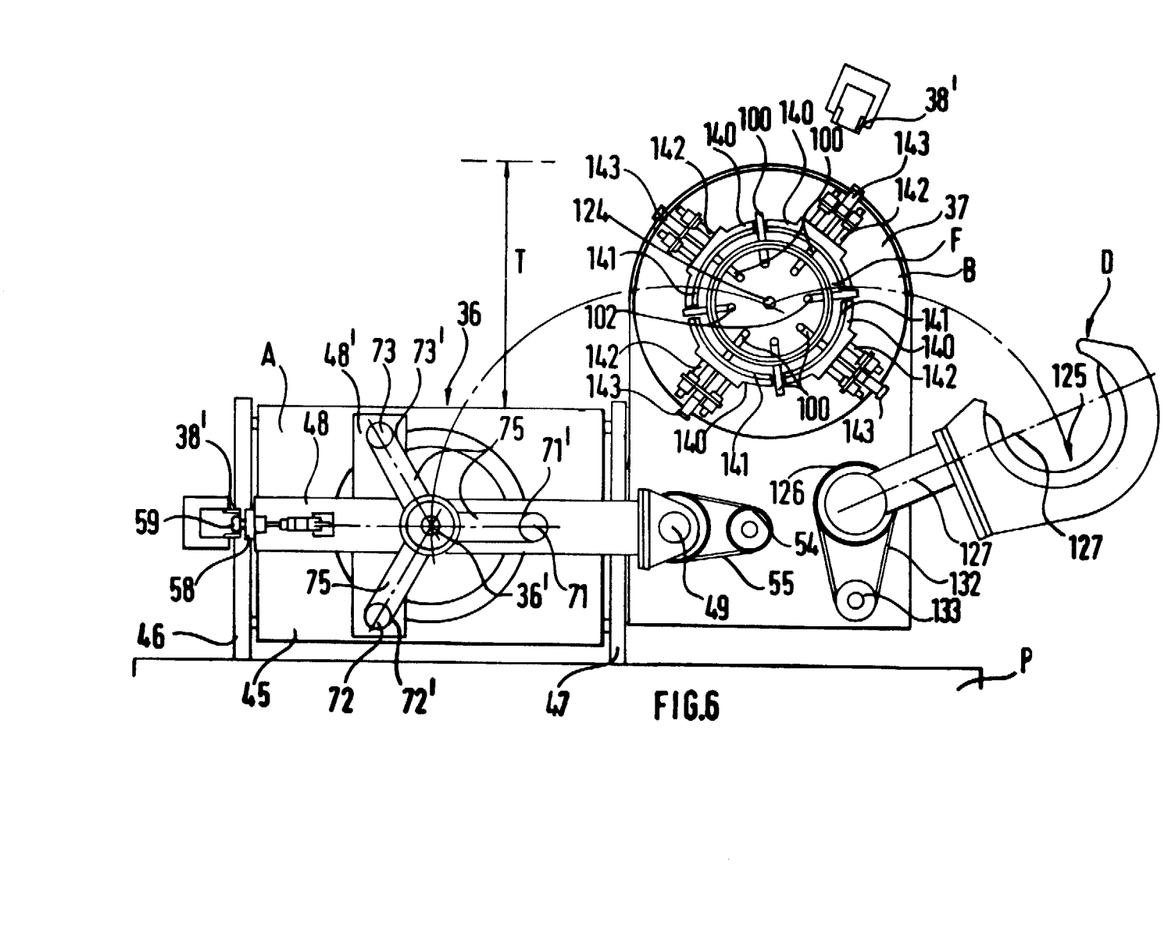
FIG. 6 is a top view of the upper frame when it is displaced from the lower frame of the apparatus.

Likewise there are provided second means for restoring the parallelism between the cross member 48 and the supporting plane 45 (FIG. 6) and a second stopping means for the cross member. The second restoring means comprise again the trolley 58 and a second track 38' in the operating position B (FIG. 6). The second stopping means for the cross member 48 comprise again the pivot 62 and a corresponding seat (not illustrated) but like 63 stationary with respect to the cross member 48 and adapted to receive the end of the pivot 62 to lock angularly the cross member 48 with respect to the first upright 49.

In particular, the device 40 for spreading out both sidewalls of the tire consists (FIG. 4) of a driving plate 64 on which rods 65, 66 are arranged having teeth or projections 67, 68 for insertion into grooves 31, 32 of lower annular element 24 (FIG. 3), and means for rotating the rods about their own axes. As a matter of fact, it is possible to have four or more such rods although here reference is made only to the two rods that can be seen in FIG. 4 to simplify the description.

Figure 4:
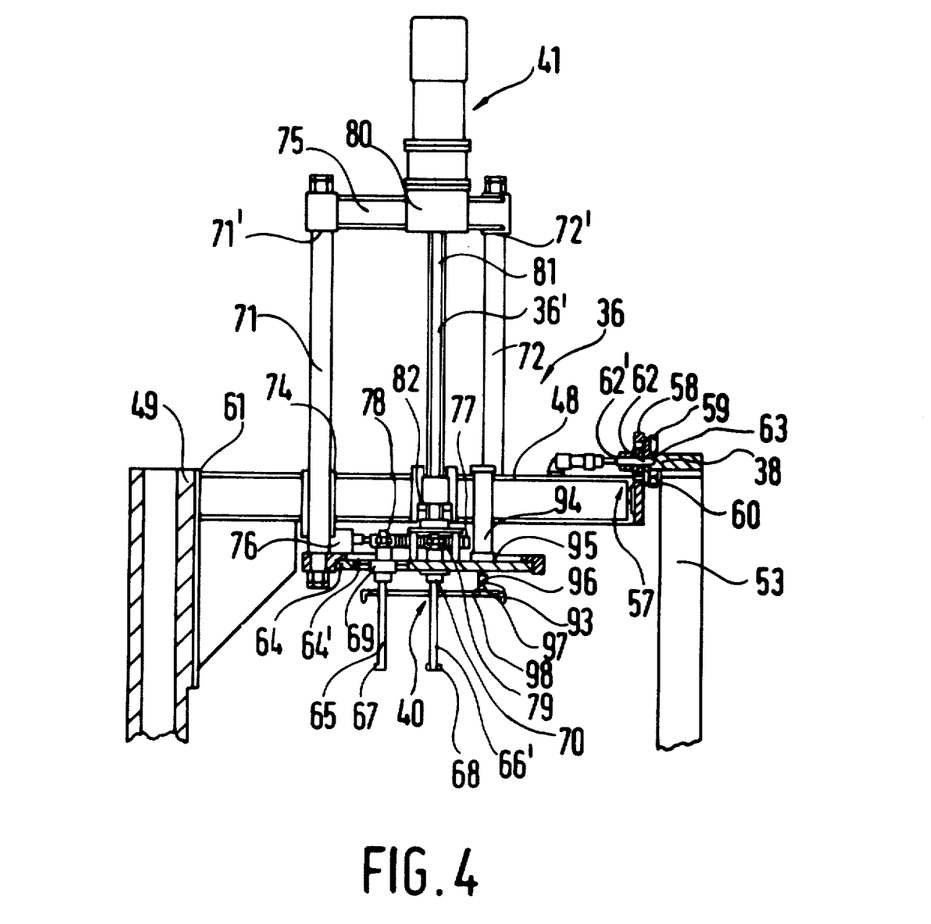
FIG. 4 represents the upper frame of the apparatus of the invention for handling the mold of FIGS. 2 and 3.

As a matter of fact, the rods 65 and 66 are located symmetrically relative to the central axis of the apparatus, whereas in FIG. 4 they are otherwise arranged simply to permit showing other details of the apparatus. These rods are mounted in cylindrical bearings 69, 70 which are slidable and can be fastened with screws to slides 64' of driving plate 64; consequently the rods are movable with respect to each other in order to be adapted for use with annular mold elements of different sizes. Driving plate 64 is parallel to face F and is attached to one end of each of three columns 71, 72 and 73 (FIG. 6) that are parallel to the central axis of the apparatus.

Column 71 slides in bushing 74 of cross member 48 (FIG. 4) and columns 72, 73 slide in similar bushings as well (not illustrade), which are situated inside a branch 48' (FIG. 6) of cross member 48.

All the second ends 71', 72', 73' (FIG. 6) of the three columns 71, 72, 73 are connected by means of bars 75 disposed parallel to face F (FIGS. 4 and 6) and connected to operating mechanism 41.

The means for rotating the rods 71, 72, 73 consist (FIG. 4) of a motor 76, which is arranged on driving plate 64 and a rack 77 joined to the motor and meshing with the upper end of each rod through gear wheels 78, 79. When the motor 76 is started, the racks move parallel to face F and cause the simultaneous rotation of gear wheels 78, 79 and therefore of the rods and teeth 67, 68. In that way, as explained hereinafter, the teeth 67, 68 are either engaged with or disconnected from grooves 31, 32 of the lower annular element 24 (FIG. 3) or can abut on the base surface 25 of the upper annular element 23 (FIGS. 2, 3) in order to move it towards the top of the apparatus.

In addition to the spreading out of the sidewalls, the spreading-out device 40 is capable of additional functions. As a matter of fact device 40 is joined to the cross member 48 (FIG. 4) and when the upper frame 36 is in the first operating position A (FIG. 6) the rod teeth or projections 67, 68 can be suitably controlled so as to be inserted in the lower annular element 24, thus backing up the inner body of the mold with the tire for the subsequent transport on face F.

In order to accomplish its various functions, the device 40 is connected to the operating mechanism 41 (FIG. 4) consisting of an electric motor 80 which operates a screw 81 with a direction of rotation according to the central axis of the apparatus. The motor 80 is attached to the ends of the bars 75 which are connected to the driving plate 64 through columns 71, 72, 73 (FIGS. 4–6).

Screw 81 screws into a threaded seat or holder 82 located in the middle of cross member 48 in such a way as to cause the rods 65, 66 to move axially along the central axis of the apparatus. The screw 81 preferably has a low coefficient of friction by means of roller or ball bearings (not illustrated) between the seat thread and the screw thread.

Figure 5:
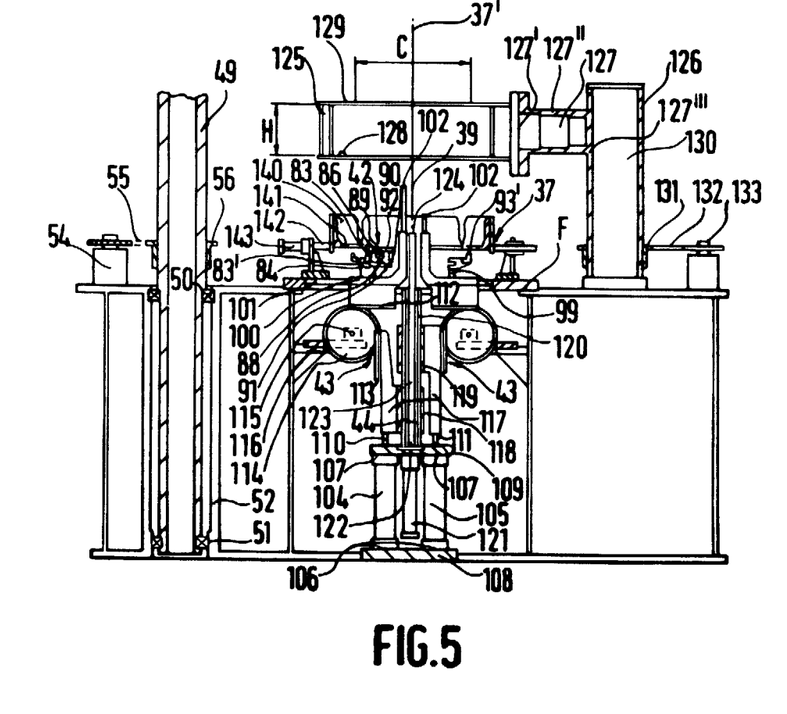
FIG. 5 represents the lower frame of the apparatus according to the invention.
Figure 11:
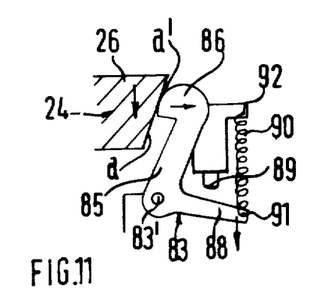
FIGS. 11 and 12 represent schematically the previous and final steps of the coupler of the lower annular element when the lower sidewall of the tire is in the spreading out step.

As already mentioned in connection with FIG. 5, the apparatus comprises locking means 42 for the lower annular element 24 when the lower sidewall of the tire is in the final spreading out position. Locking means 42 consist of a plurality of levers 83 (see FIGS. 11 and 12) each of which is pivoted about a point 83' on a bearing 84 supported on face F. The bearings 84 are movable on the face to adapt levers 83 in various positions to lock annular elements of different sizes when molds for tires of different sizes must be handled.

Each lever 83 has a first arm 85 provided with a hook or latch 86 adapted for gripping on upper base 26 (FIGS. 5, 2, 11) of the lower annular elements 24 and a second arm 88 abutting on or against a clamp 89 owing to the biasing action of a spring 90 attached to the end 91 of the second arm 88 and a fixed point 92 which is integral with face F and situated higher relative to end 91 of the second arm 88. In the preferred embodiment of FIG. 5 the second arm 88 is parallel to the face F and the first arm 85 makes an angle smaller than 90° with the second arm 88 (see also FIGS. 11, 12).

By the above arrangement, during the lowering of the lower annular element 24 in the manner explained hereinafter, the lever hooks or latches 86 remain inside thus gradually undergoing a displacement between their outer surfaces and the inner side surface (FIG. 11) of the annular element 24. This displacement gives rise to horizontal forces on the hooks thus causing a rotation of the levers around pivot points 83' and therefore corresponding expansions of the springs 90 which tend to oppose such rotations.

Figure 12:
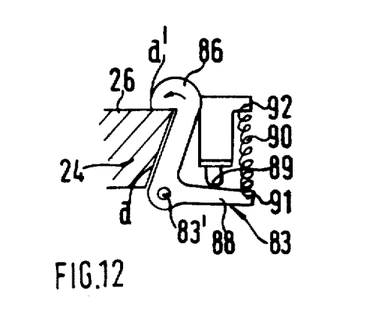

When the lower annular element 24 descends completely beneath the hooks or latches 86, the springs 90, which are not expanded any longer, give back the energy previously stored during the above-mentioned displacement and drive the hooks 86 to grip the upper base surface 26 of the lower annular element 24 (FIG. 12).

The apparatus also includes stopping means for the beads of the tire against the annular elements 23 and 24 to prevent them from being removed during the spreading-out phases of the sidewalls. With regard to the upper and lower beads of the tire, these stopping means comprise circular rings 93 and 93' (FIGS. 4, 5) having an inner diameter corresponding to the radially outermost diameter of the tire beads protruding from the inner body of the mold, at least two fluidodynamic cylinders provided with pistons for operating each circular ring, and means for fastening circular rings to the pistons.

The two fluidodynamic cylinders for the upper circular ring 93 for the upper bead, of which only the one indicated at 94 is shown in FIG. 4, are symmetrically placed relative to the central axis of the apparatus, each one having an end 95 attached to the driving plate 64 and an associated piston 96 sliding in the direction of this axis and under the driving plate 64.

Fastening means comprise a pin 97 at the end 95 of each piston 96 and a rectangular opening 98 in the circular ring, on whose edges and in contact with them the pins are sliding when the circular ring is leaning with respect to the horizontal position for whatsoever reason.

The fluidodynamic cylinders for the lower circular ring 93' for the lower bead, for which only one piston 99 is shown in FIG. 5, are arranged on face F in parallel direction with respect to the central axis. The means for fastening the lower circular ring 93' to the pistons of the fluidodynamic cylinders are not described because they are similar to those for the upper ring that has already been described.

After completing the description of that portion of the apparatus relative to the parts adapted for the spreading out of the sidewalls of the tire, the parts that perform the separation and reassembling of the sectors will now be described. These parts are all in the lower frame 37 (FIG. 5) and comprise means for effecting the simultaneous radial movements of the first and second parts of the sectors as well as means for the vertical movements of the first part of the sectors already moved radially towards the center of the apparatus.

The means effecting the synchronous radial movements comprise, per sector, a slide 100 (FIG. 5) sliding over a track 101 radially extended on face F, a first and a second propulsion device to radially move the first and the second part of the sectors respectively, connecting means between the slides, and propulsion means.

The slides 100 comprise shafts 102 (FIG. 5) parallel to the central axis of the apparatus and adapted to be inserted into holes 34 (FIG. 3) which are provided in extensions or lugs 33 of the sectors when the inner body of the mold is arranged on face F. The connection between the sectors and the slides (FIG. 7) is such that lower ends 103 of the extensions 33 protrude from the slides, so that the first part of the sectors can be lifted out of the slides along the shafts 102 by means of appropriate forces acting on those ends.

Those propulsion means consist (FIG. 5) of two fluidodynamic cylinders 104, 105 with ends 106, 107 in contact with base surface 108 and horizontal table 109 of the lower frame 37, respectively. Pistons of propulsion means 110, 111 slide parallel to the central axis and under face F to transmit radial movements to the slides through the connecting means. These connecting means consist, per slide, of a first rack 112 joined to the slide 100, a second rack 113 perpendicular to the first rack 112, a sprocket wheel meshing between the two racks with its own rotatable shaft 115 supported on a truss 116 under face F.

All the second racks 113 for the first and the second part of the sectors 15, 16 (FIG. 3) respectively are arranged on radial plates 117 protruding from a first sleeve 118 and a second sleeve 119 located above the first sleeve. Both sleeves 118, 119 are assembled around a vertical tubular guide 120 whose axis coincides with the central axis of the apparatus. Each sleeve or one or more of radial plates 117 joined to the sleeves are fixedly connected with one of the two pistons of the fluidodynamic cylinders 104, 105 so that the vertical reciprocation of the pistons causes movements of the plates with the second racks 113 and simultaneous movements of the sectors of a same group 15 or 16 by means of sprocket wheels 114 and first racks 112.

Figure 7:
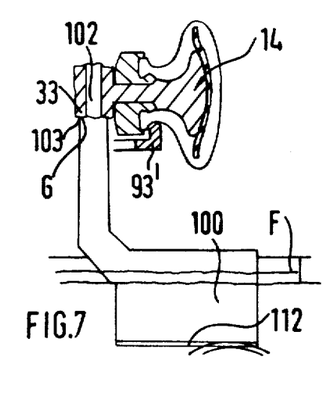
FIG. 7 shows partially a part of the inner body of the mold with the tire supported by a slide of the apparatus before spreading out the tire sidewalls.

The means for vertical traverse or movement of the first part of the sectors comprise a fluidodynamic cylinder 121, whose piston 122 is attached to a stem 123 located inside tubular guide 120. The stem 123 has an end 124 adapted for abutting on the lower extreme surface 103 of radial extensions 33 of the sectors (FIG. 7).

The apparatus also includes means adapted either for removing the tire already extracted from the sectors of the core or for the subsequent discharge of this tire outside the apparatus. These means comprise (FIG. 5) a container 125, a shaft 126 with axis of rotation 37' parallel to the axis 36' of the upper frame 36, a horizontal radially-extending arm 127 which joins container 125 to shaft 126, means for rotating arm 127 about its own axis, and means for rotating shaft 126 about its own axis.

The container 125 has lower and upper base surfaces 128, 129 parallel to face F and separated from each other by a distance H greater than width R (FIG. 1) of the tread 2 of the tire, a lower base surface 128 adapted for supporting the side surface of the tire, and a side opening between the partly open bases to allow the tire to be inserted (see FIG. 6).

Shaft 126 is placed around a tubular guide 130 fastened to the lower frame 37 and may be rotated by means of a toothed pulley 131 which meshes with a belt 132 driven by a motor 133 arranged on face F.

Horizontal arm 127 has an end 127' fixedly attached to container 125 and for most of its length it is inside and in contact with a cylindrical envelope or casing 127", whose end 127''' is attached to the shaft 126.

The means for rotating the arm 127 about its axis may be any one of many different types, for instance through a suitable motor (not shown) adapted to rotate the arm 127 relatively to its envelope 127".

By rotating shaft 126 the container 125 may be moved from a first zone outside the apparatus to a second inner zone, where it picks up the tire between bases 128, 129 and supports its weight only on the lower base 128. Arm 127, when it is rotated about its own axis, causes the inclination of the container and therefore allows the tire to be readily discharged onto a suitable discharging belt or conveyor (not illustrated).

Having described that portion of the apparatus adapted for handling the mold, the means adapted for positioning a stiffening tire waist around the sectors of the core before placing the inner body of the mold inside the outer envelope to make a new tire with such waist will now be described. These means essentially comprise (FIGS. 5, 6) a plurality of circular segments 140 having horizontal flanges 141 supported by rods 142 and moved by cylinders 143 arranged on face F. The segments 140 are moved radially toward one another by means of cylinders 143 in such a way as to support with the respective flanges 141 the lower rim of a tire waist, against which the radial thrust of all the sectors 15, 16 is exerted when they are expanded.

The operation of the apparatus will now be described with reference to the figures mentioned above and with the help of further figures where (for the sake of simplicity) only a single sector of the core and at least one of the rods of the spreading-out device are schematically represented:

When the mold is still at press P, upper plane 11 and segmented pieces 13 of outer envelope 9 (FIG. 2) respectively are removed from inner body 10 with the tire. Then lower plane 12 and inner body 10 of the mold with the tire are arranged on bearing plane 45 (FIG. 6) and first operating position A facing press P is reached by sliding bearing plane 45 along tracks 46, 47.

Upper frame 36, whose axis 36' is centered relative to the equatorial plane of the mold, is already in that position.

From now on, the following operations take place:

Operating mechanism 41 (FIG. 4) is started in such a way as to cause the lowering of driving plate 64 with rods 65, 66 by screwing screw 81 in seat 82 of cross member 48 and the operating mechanism is stopped when the teeth or horizontal extensions at the lower ends of rods 67, 68 are near the grooves or slots 31, 32 of the lower annular element 24.

Figure 8:
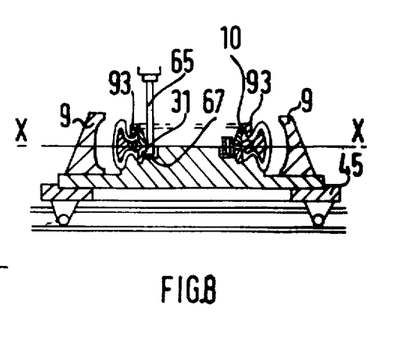
FIGS. 8 and 9 refer to particular rods of the apparatus associated with the inner body of the mold with the tire removed from the press when the upper frame is in the position of FIG. 6.

At this point the motor 76 (FIG. 4) is operated to cause the rotation of rods 65, 66 around their axes as long as tooth 67 is inserted in groove 31 (FIG. 8) and tooth 68 in groove 32 (FIGS. 4, 2). Thereafter (FIG. 4) fluidodynamic cylinder 94 and the further second cylinder (not illustrated) are started thus causing the down stroke of the relative pistons (FIG. 8) towards bearing plane 45 and the consequent contact of the end of the upper ciruclar ring 93 with the zone of a sidewall of the tire near the bead.

After the above fluidodynamic cylinders have been started, circular 93 recovers or eliminates any inclination relative to the equatorial plane of the tire if and when one of the pistons is moving at different spaced from the other. In fact, in this case pin 97 (FIG. 4) of the slowest piston, by sliding into the corresponding opening 98, thrusts circular ring 93 downwardly to effect trim of parallelism relative to the equatorial plane of the tire.

Therefore, under the above conditions, the inner body of mold 10 is joined to the rods (FIG. 8) and the upper bead of the tire is locked relative to the inner body of the mold by forces which are evenly distributed, thus avoiding damage to the tire which has just been vulcanized.

Figure 9:
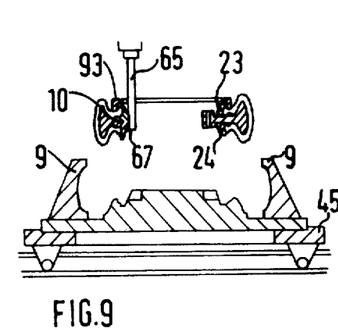
Figure 10:
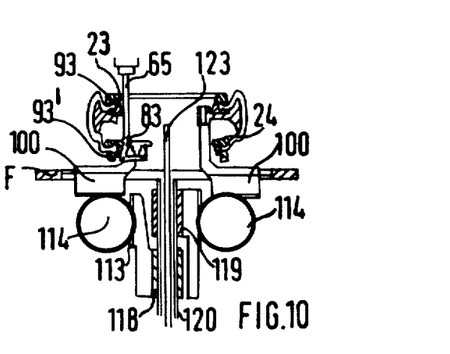
FIG. 10 is a sketch of the spreading-out step of the lower sidewalls of the tire.

In a subsequent phase, operating mechanism 41 is again started (FIG. 9) in order to lift the inner body of mold 10 with the tire by means of the rods and the above movement is stopped at a predetermined height at which there are no obstacles in the surrounding space. Soon after, motor 54 (FIGS. 5,6) is started to rotate cross member 48 about the first upright 49. This movement is stopped when the upper frame 36 is in second operating position B (FIG. 6) with its own axis 36' (FIG. 4) aligned with axis 37' of the lower frame 37 (FIG. 5).

The last portion of the arc (FIG. 6) made by the end 57 of cross member 48 takes place by means of two wheels 59, 60 (FIG. 4) of trolley 58 (FIGS. 4–6) in close contact with invitation or guide track 38 integral with the second upright 53 and therefore in such a way that this race may receive and maintain the cross member 48 in parallelism to face F. Thereafter the insertion of pin 62 into seat 63 on the second upright 53 definitively locks the two frames 36 and 37 to each other and aligns axes 36' and 37'.

This characterizing feature of the apparatus is extremely important, since it assures the absolute lack of bending of the cross member 48 owing to the weight of the inner body of the mold with tire in the working position of the upper frame and therefore the axis of the spreading-out device 40 (FIG. 4) is perfectly lined up at the center of the face.

The following working phases of the apparatus then take place soon after the previous ones in the following sequence: first the operating mechanism (FIG. 4) is started thus causing the lowering of the inner body of mold 10 with the tire together with the lowering of driving plate 64 and rods 65, 66; and this movement is continued until the holes 34 in the extensions or lugs 33 of the sectors of core 14 are brought onto corresponding shafts 102 of the slides 100 placed on face F.

Simultaneously with the above movement of the operating mechanism, the two lower fluidodynamic cylinders are started in order to move the lower circular ring 93' to the position illustrated in FIG. 7.

Consequently at the end of this phase each sector has the lower end 103 of each extension or lug 33 abutting on a special step G of shaft 102 and the lower circular ring 93' locks the lower bead of the tire. This phase takes place with extremely reduced times owing to the perfect alignment of the two frames 36 and 37.

From now on the handling of the mold proceeds according to the following phases:

Operating mechanism 41 is kept running by moving the rods and lower annular element 24 from the top to the bottom of the apparatus. During this phase, since the lower bead of the tire is pressed by circular ring 93' against the lower annular element 24, the descent of that element causes the spreading out of the lower sidewall of the tire. Always during the descent of the lower annular element 24 there is a thrusting action of the upper sidewall of the tire on the sectors of the core below that has determined its profile and after all an arrangement of all the sectors thus eliminating any possible misalignment among them for instance owing to different or imprecise sliding of the shafts 102 of the slides into the holes 34 of extensions 33 of the sectors (FIG. 7) every time the inner body of the mold is arranged on face F.

The foregoing operating condition is extremely important since only a perfect connection amongst the sectors make a subsequent simultaneous radial movement of all sectors 15 (FIG. 3) possible relative to the sectors 16.

The movement of the rods and the consequent spreading out of the lower sidewall of the tire is prolonged as long as the inner surfaces of the lower annular element 24 (FIGS. 2, 11) interferes with the outer surface a' of the hooks of levers 83 arranged on face F. That interference takes place continuously and causes the rotation of all levers 83 in such a direction as to expand the springs 90. When the above interference has ceased due to the whole lower annular element 24 moving under the hooks (FIG. 12), an immediate contraction of springs 90 is produced, which in turn causes a rotation of all the levers 83 in the direction opposite to the one that took place during the interference, with the consequent gripping or engaging of hooks 86 on the base surface 26 of the lower annular element 24.

Under the above conditions, the spreading out of the lower sidewall of the tire is definitive and operating mechanism 41 stops as well as the rods 65, 66.

In a further phase, the motors (FIG. 4) that rotate rods 65, 66 about their own axes are started thus causing the release of teeth or projections 67, 68 from the grooves 31, 32 of the lower annular element 24 and preparing the spreading-out device 40 for further operations.

Figure 13:
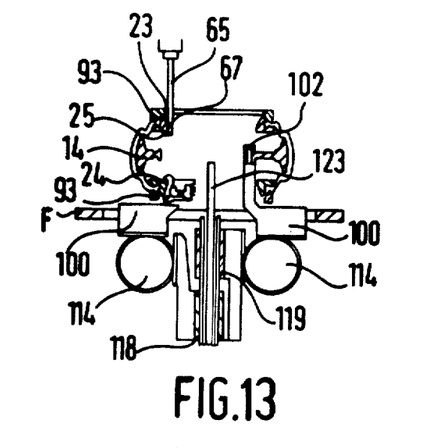
FIG. 13 shows schematically the spreading-out of the upper sidewall of the tire.

Soon afterwards operating mechanism 41 is again started to move the rods 65, 66 towards the upper part of the apparatus and during that movement motor 76 is again operated (FIG. 4) to rotate teeth 67, 68 of rods 65, 66 in such a position as to abut on lower surface 25 of the upper annular element 23 (FIG. 13). From now on operating mechanism 41 is kept running as long as the movement of the upper annular element 23 towards the upper part of the apparatus causes a spreading out of the upper sidewall of the tire exactly symmetrical to the spreading out of the lower sidewall relative to the equatorial plane X of the core as it is schematically represented in FIG. 13 (see also FIG. 2). That working phase takes place without a dragging action with respect to the top of the sectors owing to the spreading out of the upper sidewall, because the lower sidewall of the tire is already spread out and locked; it cannot be moved upwards and therefore it cannot exert any thrust on the sectors, which are therefore left in the required arrangement on the face, i.e., with the center line plane parallel to face F.

Figure 14:
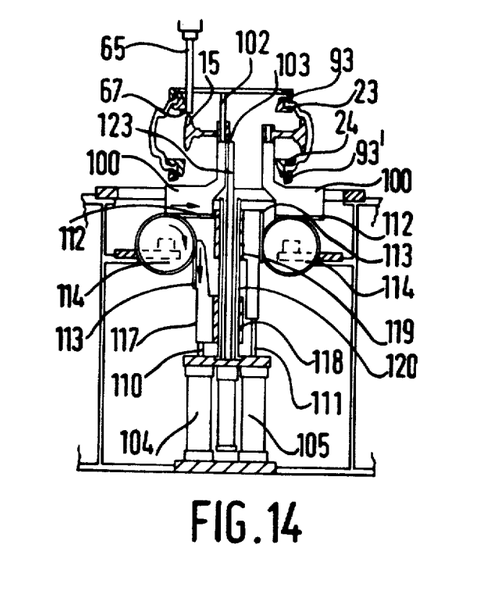
FIG. 14 shows schematically the beginning of the radial collapse step of a core sector.

After completing the spreading out of both sidewalls of the tire the phases leading to the disassembling of the sectors of the core then take place by starting the propulsion means for the first and second parts 15, 16 of the sectors respectively, as follows: first the fluidodynamic cylinder 104 of the first part of sectors 15 is started (FIG. 14) in such fashion as to move the piston 110 downwardly from the top to the bottom of the apparatus thus causing the lowering of sleeve 118, to which radial plates 117 carrying second racks 113 are joined. At the same time sprocket wheels 114 meshing with second racks 113 rotate clockwise with reference to FIG. 14 and transmit to first racks 112 and the connecting slides 100 a thrust from the left to the right (as shown in the same figure) towards the center of the apparatus.

Figure 15:
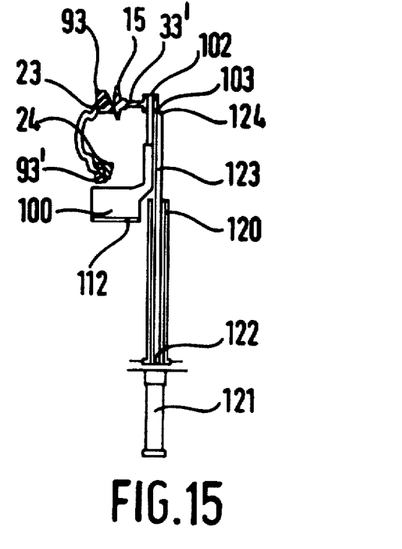
FIG. 15 shows schematically the vertical displacement of the sector of FIG. 14 already radially collapsed.

Therefore, at the end of above movement, all the sectors joined to the cylinder, which has been started, are contemporaneously contracted and a further phase then follows during which the central fluidodynamic cylinder 121 (FIG. 15) is started owing to the movement upwards of those contracted sectors in order to allow the contraction of the remaining sectors 16 (FIG. 3) as high as possible in a space now free. The actuation of cylinder 121 causes the movement upwards of piston 122 and of stem 123 (FIG. 15) inside tubular guide 120. End 124 of stem 123, which abuts on the outer lower surface 103 of extensions 33 of the first part of the sectors causes its sliding along shafts 102 of the slides to the predetermined position clearly shown in FIG. 15.

Figure 16:
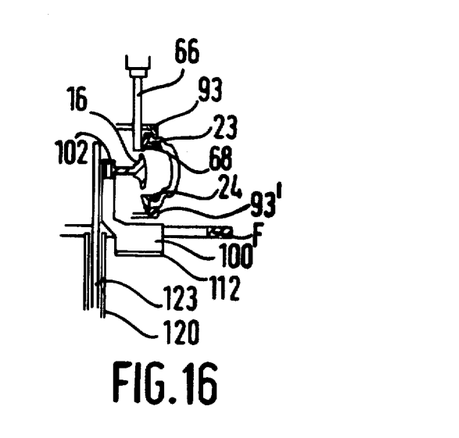
FIG. 16 shows schematically the collapse of a further sector belonging to a sector group different from that collapsed in FIG. 14.

In a further phase fluidodynamic cylinder 105 is started and, in the same way as already mentioned with regard to the symmetrical cylinder 104 (FIGS. 15,16), piston 111 of sleeve 119 and plates 117 move downwardly and consequently, via the racks and sprocket wheels already described the remaining sectors 16 radially contract at the same time, as represented in FIG. 16 for the end of above movement.

Figure 17:
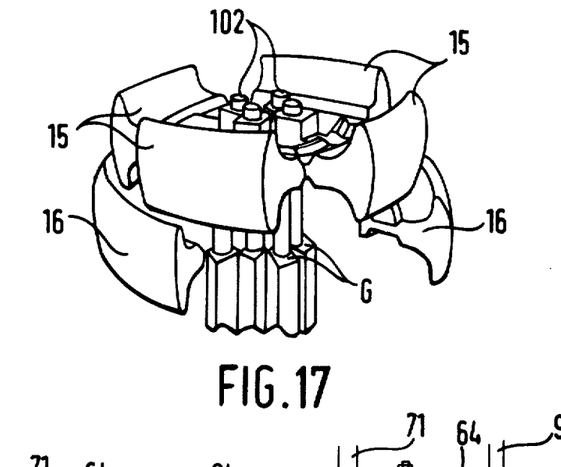
FIG. 17 shows in a perspective view the core without the tire when all the sectors are in a collapsed position.

On the whole, then, the final condition of sectors 15 and 16 at the end of above-mentioned phase is as shown in FIG. 17, where the tire has not been shown to make things easier or clearer to understand as regards the relative positions of the sectors. The foregoing disassembling phase of the core takes place in a totally automatic manner. In fact, owing to the spreading out first of the lower sidewall of the tire and then of the upper sidewall, thus assuring the absence of forces causing the movement upwards of one or more sectors, the assembling of the core on the face turns out to be entirely regular and simple, i.e., as it were a rigid core in one piece. Therefore, in view of the absence of misalignments of one sector relative to another, there is the possibility of a simultaneous disassembling at high speed of a part of the sectors relative to the others without practically meeting with any resistance to their contraction. Furthermore, owing to the characteristic feature of the rack-and-sprocket-wheel connections between the cylinders and the slides, the entire vertical force or thrust of the cylinders changes into a horizontal force or thrust on the slides, whose speed can therefore be kept desirably high for the whole traverse. This result allows one to achieve radical movements of the sectors at equal speed with ease as well as to handle molds with the same number of sectors and different outer diameters adapted for molding tires of different sizes. In such cases, even if the traverse of the slides changes, since the cylinders are the same and the speed transmitted to the slides is always the same, there is the great advantage of keeping the part of the apparatus relating to the contraction of the sectors and the required degree of automatism unchanged.

After bringing about the contraction of the sectors 15, 16, there follow further working phases for extracting the tire from the apparatus. In a first such phase, the fluidodynamic cylinders joined to the lower circular ring 93 are started in such a way as to move the tire away from the contact position (FIG. 15) on the lower bead and soon afterwards the operating mechanism 41 is started by moving driving plate 64, rods 65, 66 with upper annular element 23 to which the tire is joined towards the top of the apparatus.

Figure 18:
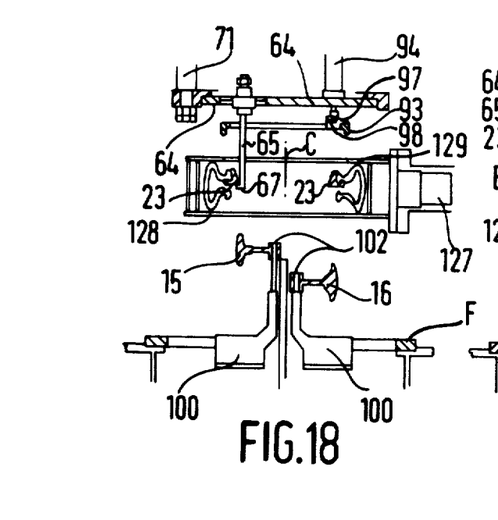
FIGS. 18 and 19 show schematically the removal steps of the tire.

During the above movement the tire is only anchored to the upper annular element 23, since the lower bead comes now quickly out of the lower annular element 24 owing to the elasticity stored by the lower sidewall during previous locking. The movement of the tire towards the top of the apparatus takes place without obstacle through the core which is completely contracted as long as a predetermined height is reached relative to the face F in a free space, where container 125 can then be moved into position for withdrawing the tire (FIG. 18).

This operation is carried out as follows: First the motor 133 (FIG. 6) is operated thus causing the rotation of shaft 126 and arm 127 as well as of container 125 from position D outside upper frame 36 to inner position B, where bases 128, 129 (FIG. 18) of container 125 are inserted above and under the tire.

Figure 19:
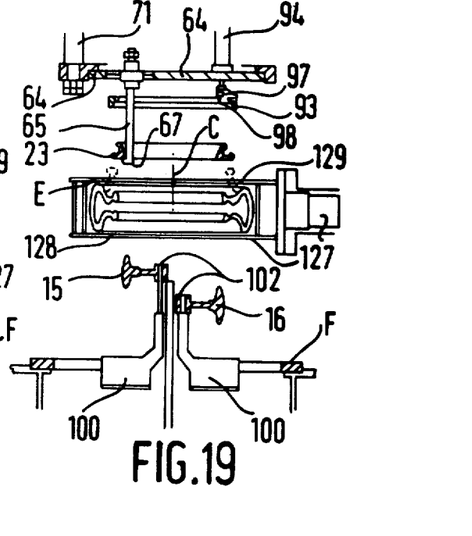

Successively the upper circular ring 93 rises from the upper bead of the tire and operating mechanism 41 is again started in order to extract the upper annular element 23 (FIG. 19) from the top of container 125 through opening C (FIG. 5) by means of rods 65, 66. During this movement the upper part of the tire abuts on edge E of upper base 129 of the container 125 and, since the tire simply rests on the upper annular element 23, it is easily removed and settles on the lower base 128 of the container 125. If then the upper annular element 23 is outside the container as represented in FIG. 19, the movement of rods 65, 66 stops, motor 133 is operated in the direction opposite to its previous movement in order to move container 125 from position B (FIG. 6) to position D.

Successively the motor is operated and (FIG. 5) causes the rotation of arm 127 about its own axis and the sliding off of the tire towards a suitable conveyor belt (not illustrated).

Figure 20:
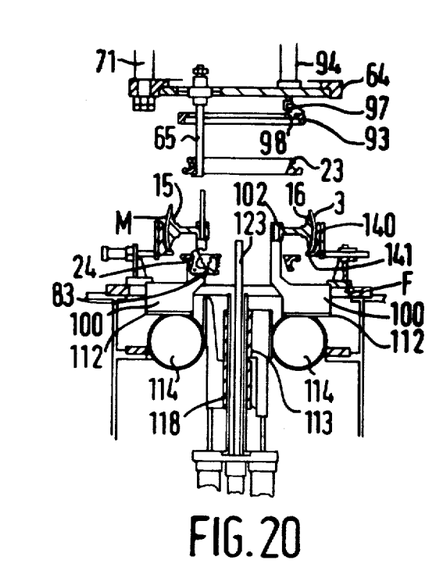
FIGS. 20 and 21 show schematically the positioning steps of a breaker for tires around the sectors of the inner body of the mold in the expanded position.

After the above working phases, assembling (or reassembling) of the mold for making a new tire is carried out according to the following phases: First a tire waist 3 is placed on flanges 141 of segments 140 already placed on face F (FIG. 20). Then sectors 16 and successively sectors 15, after bringing them on the equatorial plane of the mold, expand towards waist 3 of the tire and in the direction opposite to what has been described above, thus moving the sectors from the positions represented in FIGS. 15 and 16 to the final position of FIG 20. The above radial movements of sectors 15 and 16, owing to the action of fluidodynamic cylinders 104, 105 (FIG. 5) connected with slides 100 by the racks and sprocket wheels already described, take place at the same time. This is important since it assures that no sector shall arrive in position with respect to the waist 3 before the others, thus warping it in a more or less permanent way or at least entirely unacceptably for the final tire that is obtained during the following phase of injection to press P.

Figure 21:
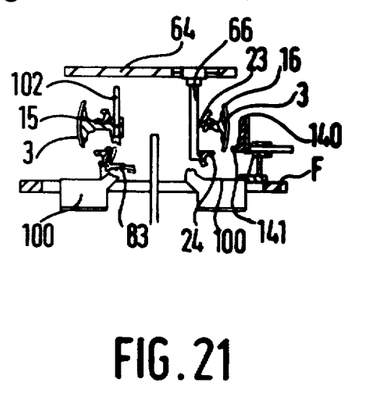
Figure 22:
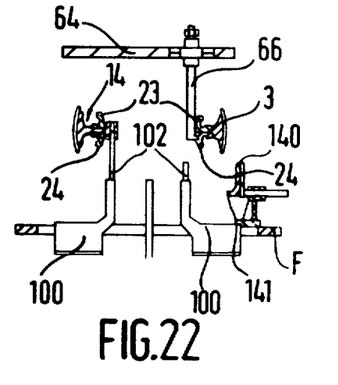
FIG. 22 shows schematically the reassembling of the inner body of the mold before carrying it to the press for making a new tire.

In the further phases, the operating mechanism is first operated to move the upper annular element 23 towards the core (FIG. 21) and then, after releasing the lower annular element 24 from the hooks of levers 83 (for instance automatically by means of an arrangement consisting of a small piston (not represented which thrusts lock or clamp 89 (FIG. 12) downwardly) the rods are operated again, as already described, to provide a grip on the lower annular element 24 and bring it into contact with the core 14 (FIG. 22).

At this point the inner body of the mold is reassembled whereupon it is possible to start the rotation of the upper frame 36 (FIG. 4) from the second operating position B (FIG. 6) to the first position A and to place the inner body of the mold with waist 3 of the tire inside the outer envelope which is on bearing plane 45.

In a final phase, rods 65, 66 are removed from the lower annular element 24, the inner body of mold 10 is carried on bearing plane 45 along tracks 46, 47 to the press P, and finally the cycle for the molding of a new tire is repeated as described above.

What is claimed is:

1. An apparatus for driving a mold for making a tire, said mold consisting essentially of an outer envelope and an inner body joined to define the required shape of the tire, said inner body consisting of a core having sectors which can be radially taken to pieces, and at least two annular elements, an upper one and a lower one, separable from each other and from the core in the direction of the core axis, said elements having at least two surfaces which form axially inner surfaces for the beads of the tire to be made, said apparatus consisting essentially of an upper frame, a lower frame having a face for the mold horizontally arranged thereon, said frames having their vertical central axes lined up with each other to form the vertical central axis of the apparatus, said apparatus being further characterized by the fact of consisting essentially of one device for spreading out the sidewalls of the tire in different phases and one operating mechanism for the spreading-out device respectively on the upper frame and locking means for the lower annular element in the final and locking means for the lower annular element in the final position corresponding to the lower sidewall when spread out, means for effecting contemporary radial movements of a first and second part of the sectors, means for the vertical displacement of said first part of the sectors that have already been moved radially and at the same time towards the center of the apparatus.

2. An apparatus as defined in claim 1, characterized by the fact that said device for spreading out both sidewalls consists essentially of a driving plate, at least two rods with meshing teeth fitting in special grooves in the lower annular element, means for rotating the rods about their own axes, said driving plate being assembled in a position parallel to the face at the first ends of at least two columns, which are parallel to the central axis of the apparatus and which can slide in two bushings of a horizontal cross member placed between the ends of two vertical uprights of the upper frame, the second ends of said columns being joined to the operating mechanism, and said rods being assembled on the driving plate in a symmetrical position relative to the central axis of the apparatus.

3. An apparatus as defined in claim 2, characterized by the fact that said operating mechanism of the spreading-out device consists essentially of a motor which operates a screw rotating in a direction according to the central axis of the apparatus, said motor resting on the center of at least one bar placed between the second ends of the said columns and the screw being inserted in a special threaded seat at the center of the said cross member.

4. An apparatus as defined in claim 3, characterized by the fact that bearings are placed between the screw and the threaded seat.

5. An apparatus as defined in claim 2, characterized by the fact that said rods are assembled on the driving plate by means of horizontally movable elements.

6. An apparatus as defined in claim 2, characterized by the fact that the said means for rotating the rods about their own axes consist essentially of an electric motor fastened to the driving plate and toothed pulleys for the rods meshing with a special driving belt operated by a pulley associated with the said electric motor.

7. An apparatus as defined in claim 1, characterized by the fact that said locking means for the lower annular element consist essentially of a plurality of levers hinged on a support for the face, each lever having an end equipped with a hook adapted for gripping the upper surface of the lower annular element and the opposite end being subject to the action of a spring adapted to bias the lever against a special lock, said levers being removed from the biased position against the lock when the inner surface of the lower annular element interferes with the outer surface of the hook thus overcoming the action of the springs.

8. An apparatus as defined in claim 1, characterized by the fact that said means for contemporary radial movements of a first and second part of the sectors consist essentially of one slide per sector sliding over a track radially placed on the face, a first and second propulsion device to move the first and second part of the sectors respectively, connecting means between said slides and said propulsions means, said propulsion means being placed under the face with axes parallel to the vertical central axis of the apparatus in such a manner as to give rise to vertical forces transmitted to the slides joined to the sectors by means of said connecting means.

9. An apparatus as defined in claim 8, characterized by the fact that said connecting means consist essentially, for each slide joined to a sector, of a first and a second rack perpendicular to each other and meshing with a sprocket wheel, the first racks being joined to the slides, the second racks being located by planes axial to the apparatus and the second racks relative to the slides of the first and second part of the sectors being joined to the first and the second propulsion device respectively, all the sprocket wheels being adapted to rotate around special shafts supported on a second face of the lower frame parallel to and under the face.

10. An apparatus as defined in claim 9, characterized by the fact that the second racks joined to the slides of the first and second part of the sectors by means of the sprocket wheel and the first racks are placed on plates radially protruding from a first and a second sleeve respectively, assembled around a tubular guide having an axis coinciding with the central axis of the apparatus, said second sleeve overhanging the first sleeve, both slides being slidable along said tubular guide when the propulsion means give rise to vertical forces.

11. An apparatus as defined in claim 8, characterized by the fact that said propulsion means consist essentially of two fluidodynamic cylinders placed on the lower frame in a symmetrical position relative to the central axis of the apparatus having ends between a base surface and a horizontal table.

12. An apparatus as defined in claim 1, characterized by the fact that said means for vertical movements of said first part of the sectors already radially moved towards the center of the apparatus consist essentially of a fluidodynamic cylinder, whose axis is lined up with the central axis of the apparatus and an end being joined to a special horizontal table integral with the lower frame in a position below the face, a stem joined to the piston of the cylinder with an end passing through the face adapted to interfere with and to grip said extensions of the sectors already moved towards the center of the apparatus.

13. An apparatus as defined in claim 12, characterized by the fact that said stem is inside the said tubular guide.

14. An apparatus as defined in claim 1, characterized by the fact of including temporary stopping means for the bead of the tire against the annular elements.

15. An apparatus as defined in claim 14, characterized by the fact that said stopping means consist essentially, per bead, of a circular ring having an inner diameter corresponding to the radially outermost diameter of the beads of the tire protruding from the inner body of the mold, at least two fluidodynamic cylinders with associated pistons for operating each circular ring, said pistons being equipped with pins housing in special openings of the circular rings and sliding over the edges of said openings when the circular ring is leaning relative to a horizontal position, the fluidodynamic cylinders of the circular ring for the upper bead being arranged with an end attached to a special driving plate joined to the operating mechanism of the upper frame and the associated pistons being slidable under the driving plate in the direction of the central axis of the apparatus, the fluidodynamic cylinders of the circular ring for the lower bead being arranged on the face of the lower frame and having pistons slidable upwardly in a direction parallel to the central axis of the apparatus, said circular rings being arranged coaxially with respect to the two annular elements with circular edges in contact with the sidewalls of the tire near the beads when the inner body of the mold is joined to the apparatus.

16. An apparatus as defined in claim 3, characterized by the fact that the upper frame is capable of movement relative to the lower frame in order to remove the inner body of the mold with the tire from the molding and vulcanization zone to the handling zone.

17. An apparatus as defined in claim 16, characterized by the fact that the upper frame consists essentially of at least one horizontal cross member overhanging a first vertical upright, said cross member supporting the weight of the operating mechanism and of the spreading-out device to which the inner body of the mold with the tire is joined, means for rotating the first upright about its own axis, means for stopping the cross member on a second vertical upright and positioning it angularly relative to the first upright in order to center the axis of the upper frame with the axis of the lower frame.

18. An apparatus as defined in claim 17, characterized by the fact that said first vertical upright is located by means of inserted bearings inside a cylindrical hollow column integral with the lower frame, and that said means for rotating said first upright are arranged on the face of the lower frame.

19. An apparatus as defined in claim 17, characterized by the fact that it includes means for restoring the parallelism between said cross member and the face of the lower frame.

20. An apparatus as defined in claim 19, characterized by the fact that said restoring means consist essentially at the free end of the cross member of a two-wheeled trolley, an upper wheel and a lower one, and of an supporting race for the two wheels of the trolley on the lower frame, said race having an end located on the second upright, the height thereof from the face corresponding to that of the end of the cross member joined to the first upright and the initial end at a lower height in order to allow perfect parallelism between cross member and face.

21. An apparatus as defined in claim 20, characterized by the fact that the final position of the trolley on the second upright is attained by inserting a pin placed between the two wheels of the trolley into a corresponding seat of said second upright.

22. An apparatus as defined in claim 17, characterized by the fact that the cross member joined to the first upright rotates from a first operating position, where the central axis of the spreading-out device is lined up to a bearing plane on which the mold lies, to a second operating position where the axes of the upper and lower frame are lined up.

23. An apparatus as defined in claim 1, characterized by the fact that it comprises means for extracting the tire from the upper frame and for discharging said tire from the apparatus.

24. An apparatus as defined in claim 23, characterized by the fact that said means for extracting and discharging the tire consist essentially of a practically flat container with base surfaces separated from one another by a distance greater than the width of the tread of the tire, a lower base surface adapted to support the tire, a side surface of the container open by an amount at least equal to the greatest radial size of the tire being manufactured, an upper base surface having a central opening to allow the extraction of the upper annular element, a rotatable shaft having its axis parallel to the axis of the upper frame, a horizontal arm which joins the container to the shaft, means for rotating the arm about its own axis, and means for rotating the shaft about its own axis.

* * * * *